United States Patent
Brown et al.

(10) Patent No.: US 12,444,277 B1
(45) Date of Patent: Oct. 14, 2025

(54) ACTIVITY DETECTION AT POINT OF SALE

(71) Applicant: Toshiba Global Commerce Solutions, Inc., Durham, NC (US)

(72) Inventors: Philip Brown, Apex, NC (US); Evgeny Shevtsov, Plano, TX (US); Johanna Hinkle, South Bend, IN (US); Viktor Ivakhno, Cary, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/616,796

(22) Filed: Mar. 26, 2024

(51) Int. Cl.
*G07G 1/00* (2006.01)

(52) U.S. Cl.
CPC .................. *G07G 1/0072* (2013.01)

(58) Field of Classification Search
None
See application file for complete search history.

(56) References Cited

U.S. PATENT DOCUMENTS

| | | | | |
|---|---|---|---|---|
| 11,501,614 B2* | 11/2022 | Wen | ........................ | G07G 3/006 |
| 2014/0176719 A1* | 6/2014 | Migdal | ................ | G08B 29/188 |
| | | | | 348/150 |
| 2016/0078300 A1* | 3/2016 | Kundu | ................ | G06Q 20/208 |
| | | | | 348/150 |
| 2023/0120798 A1* | 4/2023 | Palande | ................ | G06V 10/25 |
| | | | | 705/23 |

OTHER PUBLICATIONS

Simplifying Self-checkout by Combining the Security and Flatbed Scales in a Scan and Bag Self-checkout Lane, 2012, The IP.com Journal, https://ip.com/IPCOM/000214850 (Year: 2012).*

* cited by examiner

*Primary Examiner* — Thien M Le
*Assistant Examiner* — April A Taylor
(74) *Attorney, Agent, or Firm* — Kaufman & Canoles, P.C.

(57) ABSTRACT

Systems and methods of detecting activity at point of sale are provided. In one exemplary embodiment, a method is performed by a POS system having an optical sensor device, an optical scanner device and a load sensor device. The optical sensor device has a field of view that includes a first region about the POS system and the load sensor device is operable to measure a load of an object while positioned in a bagging area of the POS system. Further, the first region includes a second region associated with a certain object type that can be positioned in the bagging area without having to be scanned or weighed. The method includes obtaining a successive image captured by the optical sensor device to enable a determination that the target object corresponds to the certain object type that is exempt from being scanned or weighed based on the successive image.

20 Claims, 6 Drawing Sheets

ACTIVITY DETECTION AT POINT OF SALE

BACKGROUND

Retailers use point of sale (POS) hardware and software systems to streamline checkout operations and to allow retailers to process sales, handle payments, and store transactions for later retrieval. Each POS system generally includes a number of components including a POS terminal station and a POS bagging station. POS bagging stations can enable customers or retail staff to bag purchased retail items in shopping bags during checkout at the POS systems. POS terminal station devices can include a computer, a monitor, a cash drawer, a receipt printer, a customer display, a barcode scanner, or a debit/credit card reader. POS systems can also include a conveyor belt, a checkout divider, a weight scale, an integrated credit card processing system, a signature capture device, or a customer pinpad device. While POS systems may include a keyboard and mouse, more and more POS systems include monitors with touchscreen technology. Further, the software integrated with POS systems can be configured to handle a myriad of customer-based functions such as product scans, sales, returns, exchanges, layaways, gift cards, gift registries, customer loyalty programs, promotions, and discounts. In a retail environment, there can be multiple POS systems in communication with a server over a network.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

A self-checkout station can utilize weight-based item security to ensure consumers place scanned items in a shopping cart or bag. Further, a computer vision system can capture video of activities associated with a self-checkout station and can analyze consumer interaction and behavior based on the captured video. Further, certain models and algorithms can be integrated at different stages in the processing of the captured video. These models and algorithms can extract useful information from the captured video and can process the captured video to represent various stages of consumer interaction with the self-checkout terminal. For instance, a computer vision system can be utilized to detect a consumer placing scanned or weighed items in a shopping cart or bag. Further, the computer vision system can detect unscanned or unweighed items being placed in a shopping cart or bag and in response can generate an alert to a possible fraud. As such, a computer vision system can be configured to evaluate certain behavior of consumers at a self-checkout station to improve detection of non-fraudulent and possible fraudulent activities by consumers. For instance, a computer vision system can detect and determine that a consumer grabbing a paper bag from a plastic bag holder is not a retail item and does not require being scanned or weighed.

Furthermore, a self-checkout station having only weight-based retail item security via a weight scale in the bagging area is likely unable to determine whether a non-retail item (e.g., shopping bag, purse, wallet, phone) has been placed on the scale. For instance, a consumer takes a reusable shopping bag from a shopping cart and places the reusable shopping bag in the bagging area so that the consumer can conveniently place scanned or weighted retail items in the reusable shopping bag. Further, the self-checkout station obtains the measured weight of the reusable shopping bag while in the bagging area and then notifies the consumer to remove the unexpected weight. Additionally or alternatively, the self-checkout station can prompt the consumer to confirm whether the unexpected weight is associated with an unscanned item. However, under each of these scenarios the consumer experiences additional delay and friction during the self-checkout process and may need to flag a store clerk to resolve the issue.

In this disclosure, embodiments described herein can include the use of a computer vision system to detect an object that is transferred from a predefined location (e.g., shelf holding available shopping bags, a purse hanging from the shoulder of a consumer, a reusable shopping bag placed in a shopping cart) about a self-checkout station to the bagging area of the self-checkout station. When a weight of that object is detected and measured by the weight scale in the bagging area, the self-checkout station through the computer vison system can detect and classify or identify the object as a non-retail item and as such, can indicate that the object can be placed in the bagging area without having to be scanned or weighed.

Figure 1:
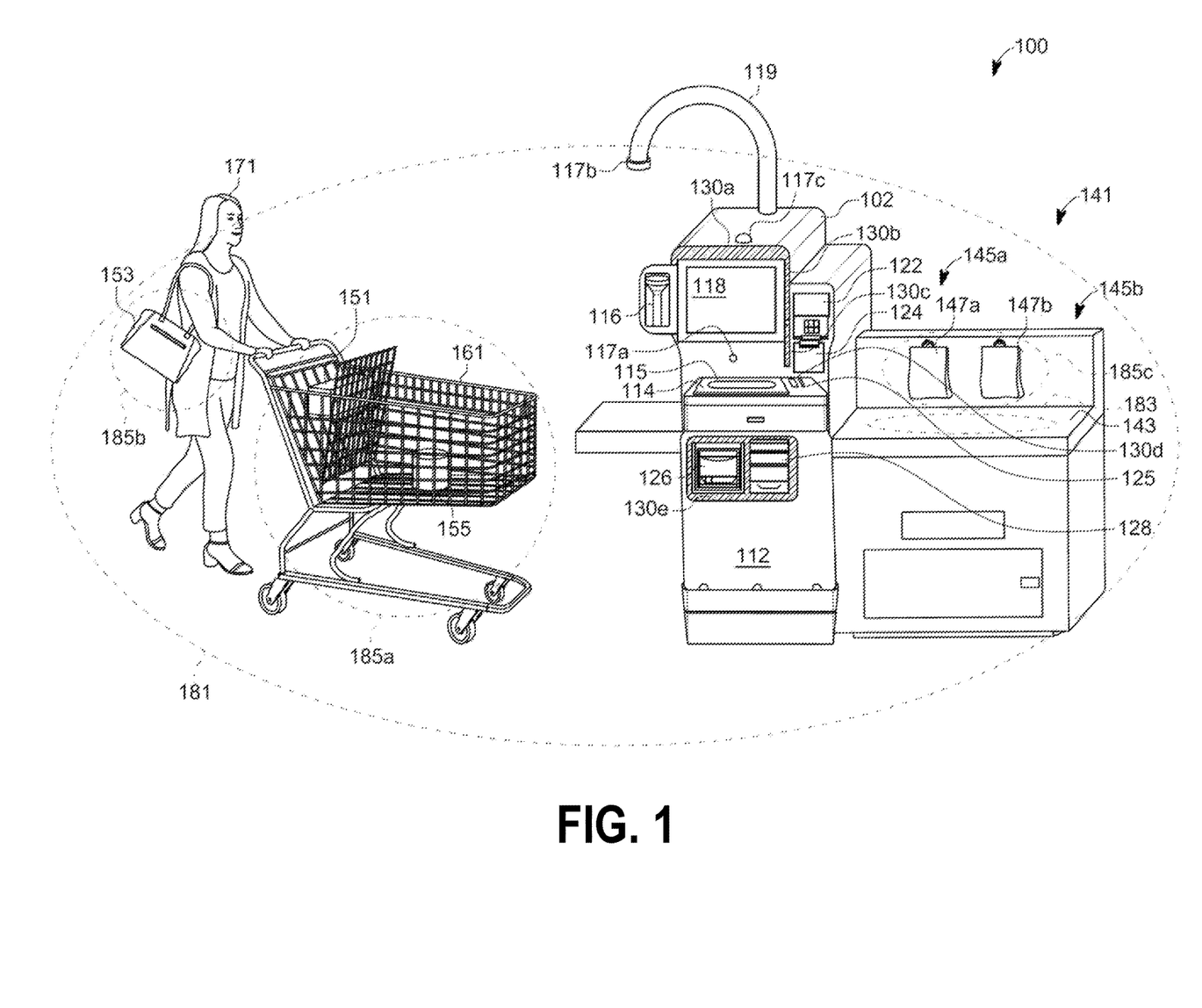
FIG. 1 illustrates one embodiment of a POS system operable to perform activity detection at point of sale in accordance with various aspects as described herein.

FIG. 1 illustrates one embodiment of a POS system 100 operable to perform activity detection at point of sale in accordance with various aspects as described herein. As shown in FIG. 1, the POS system 100 (e.g., checkout station device, self-checkout station device) can be communicatively coupled to a network node (e.g., server) over a network (e.g., Ethernet, WiFi, Internet). The POS system 100 can include a terminal station device 102 and a bagging station device 141. The terminal station device 102 has a housing 112, a scan platform 114 having a scanner window 115 through which an optical scanner device disposed in the POS system 100 can scan a visual object identifier code (e.g., barcode, QR code) disposed on an object (e.g., retail item) while on or about the scanner window 115, another optical scanner 116 (e.g., portable or handheld scanner), a display device 118 (e.g., touchscreen), a payment processing mechanism 122 (e.g., credit card transaction device), a printer 124, a coupon slot mechanism 125, a cash acceptor mechanism 126, a change (e.g., coins, cash) interface mechanism 128, the like, or any combination thereof. In addition, the terminal station device 102 can be configured to include a set of light emitting element (LED) devices 130*a-e* (collectively, LED devices 130). The housing 112 can be configured to include a cabinet that contains a processing circuitry operable to control the operations and functions of the POS system 100. Each LED device 130*a-e* can be configured to be individually or collectively controlled by a processing circuit of the POS system 100 to indicate certain contextual information to a consumer or a retail store clerk. Although not explicitly shown herein, the housing 112 can also contain cabling and other functional components that communicatively couple the POS system 100 to a network (e.g., Ethernet, WiFi, Internet) or a network node (e.g., server) over the network or that communicatively couple the terminal station device 102 to the bagging station device 141. The bagging station device 141 can include a bagging area 183 associated with a load sensor device 143.

In FIG. 1, each scanner device 115, 116 can be configured as an optical scanner device operable to scan a visual object identifier code (e.g., barcode, QR code) disposed on an object (e.g., retail item) that a consumer intends to purchase via the POS system 100. The scanner device 116 can be configured as a hand-held, battery-operated scanner that a consumer or a clerk can remove from its battery charging dock to scan barcodes on retail items such as without having to remove them from a shopping cart. Each visual object identifier code can represent one of a set of object identifiers (e.g., UPCs), with each identifier being specific to a certain object (e.g., retail item, trade item) and represented by a series of characters (e.g., numeric characters, alphabetic characters, alphanumeric characters). Universal Product Code (UPC), which can refer to UPC-A, consists of a sequence of twelve characters (e.g., 12 numeric characters) that are uniquely assigned to each object. Along with the related International Article Number (EAN) barcode, the UPC is the barcode mainly used for scanning retail items at the point of sale, per the specifications of the international GS1 organization. In one example, a UPC-A barcode consists of a sequence of twelve characters (e.g., 12 digits), which are made up of four sections: a number system character, a five-character manufacturing number, a five-character item number and a check character.

In FIG. 1, the scanner device 115 can include a scanner window and can be operable to perform dual scanner and weight scale functions to allow the retail item to be contemporaneously scanned and weighed for purchase by a consumer. The scan platform 114 can be configured to allow an object to be placed on the scan platform 114 to enable the object to be weighed by the weight scale function. The display 118 can be operable to display information associated with retail items being purchased by a consumer. The payment processing mechanism 122 can be configured with a pinpad device operable to accept a non-cash payment vehicle (e.g., credit card or debit card), while the printer 124 can be configured to print receipts or coupons. The coupon slot mechanism 125 can include a generally elongated slot configured to receive coupons being redeemed by a consumer. The cash acceptor mechanism 126 can be operable to receive cash (e.g., paper money, coins) from the consumer for the retail items being purchased by the consumer. The change interface mechanism 128 can be operable to provide change to the consumer in the form of paper money or coins. The terminal station device 102 can also include optical sensor devices 117*a-c* (e.g., camera). Each optical sensor device 117*a-c* can be operable to capture an image of at least a portion of the POS system 100, capture an image about the POS system 100 that includes a first region 181, capture an image of the environment surrounding the POS system 100, capture an image of one or more surfaces of the POS system 100 such as the scan platform 114 or the bagging area 183, or the like. The optical sensor device 117*a* can have a field of view that includes the scan platform 114. The optical sensor device 117*b* can have a field of view that includes the POS system 100, a region about the POSs system 100 and the environment about the POS system 100. While the optical sensor device 117*c* is shown in FIG. 1 at the end of an extension mechanism 119 (e.g., pole) of the POS system 100 that extends the optical sensor device 117*c* above the POS system 100, in other embodiments, the optical sensor device 117*c* can be disposed on a ceiling surface above the POS system 100, positioned on the POS system 100, or the like. The optical sensor device 117*c* can be operable to capture the environment about the POS system 100 such as to detect a consumer entering the first region 181.

In operation, the POS system 100 can obtain an image associated with the first region 181 about the POS system 100. For instance, the processing circuit of the POS system 100 can receive from the optical sensor device 117*a-c* the image data associated with the first region 181. The captured image of the first region 181 can represent, for instance, a consumer 171 with a shopping cart 161 before the POS system 100. The first region 181 can include one or more second regions 185*a-c* such as associated with objects 147*a-b*, 151, 153, 155 that can be placed in the bagging area 183 without having to be scanned or weighed. In one example, the second region 185*a* can be associated with a shopping cart 161 and the target object can be an object 151, 153 associated with the consumer 171 (e.g., clothes, hat, purse, handbag, wallet, eyewear, phone, laptop, shopping bag, coffee, soda, return item) that is in the shopping cart 161. In another example, the second region 185*b* can be associated with the consumer 171 (e.g., head, shoulders, waist) and the target object can be an object 153 that is carried by or on the consumer 171 (e.g., clothes, hat, purse, handbag, wallet, eyewear, phone, laptop, shopping bag, coffee, soda). In yet another example, the second region 185*c* can be associated with the POS system 100 such as the shopping bag holder 145*a,b* having shopping bags 147*a,b* available for use by the consumer 171 during self-checkout and the target object can be each available shopping bag 147*a,b*.

Furthermore, the POS system 100 can apply pre-processing to each successive image. For instance, the POS system 100 can apply a first filter on each successive image to reduce image artifacts and noise; convert color pixels of each successive image to grayscale pixels of that image; orient each successive image to have the same orientation as the first or second region; crop each successive image based on a perimeter of the first or second region; or reduce a resolution of each successive image. The POS system 100 can also enhance each successive image.

In FIG. 1, the POS system 100 can detect activity in the first region 181 based on at least one of the successive images. In one example, the POS system 100 detects that the consumer 171 is proximate the POS system 100. In another example, the POS system 100 detects that the consumer 171 is placing an object in the bagging area 183. In yet another example, the POS system 100 detects that the consumer 171 is accessing the shopping bag holder 145*a,b*. In yet another example, the POS system 100 detects that the consumer 171 is accessing the shopping cart 161. In yet another example, the POS system 100 detects that the consumer 171 is removing an object from the shoulder or pocket of the consumer 171. The POS system 100 can determine that the detected activity in the first region 181 corresponds to the second region 185a-c based on at least one of the set of successive images. Further, the POS system 100 can determine that the detected activity in the second region 185a-c corresponds to the target object 147a-b, 151, 153, 155 based on at least one of the set of successive images.

The POS system 100 can also detect activity in the bagging area 183 based on at least one of the set of successive images. Further, the POS system 100 can determine that the detected activity in the bagging area 183 corresponds to the target object 147a-b, 151, 153, 155 being placed in the bagging area 183. In one example, the detected activity in the bagging area 183 corresponds to the consumer 171 placing the target object 151, 153, 155 in the bagging area 183. In another example, the detected activity in the bagging area 183 corresponds to the consumer 171 placing the target object 147a,b (e.g., plastic bag) in the bagging area 183. In addition, the POS system 100 can determine that the target object 147a-b, 151, 153, 155 corresponds to a certain object type (e.g., clothes, hat, purse, handbag, wallet, eyewear, phone, laptop, shopping bag, coffee, soda, return item) that can be transferred from the second region 185a-c to the bagging area 183 without having to be scanned or weighed. In one example, the certain object type corresponds to a shopping bag 147a,b available from the shopping bag holder 145a,b. In another example, the certain object type corresponds to an object that is associated with the consumer 171. The POS system 100 can then determine that the target object 147a-b, 151, 153, 155 of the certain object type can be in the bagging area 183 without having to be weighed or scanned.

In another embodiment, the POS system 100 can obtain a load measurement of the target object 147a-b, 151, 153, 155, while positioned in the bagging area 183. For instance, the processing circuit of the POS system 100 can receive from the load sensor device 143 the load measurement associated with the target object 147a-b, 151, 153, 155 while positioned in the bagging area 183. Further, the POS system 100 can determine that the load measurement of the target object 147a-b, 151, 153, 155 corresponds to an unexpected load measurement in the bagging area. For instance, if an object is not scanned or weighed prior to being placed in the bagging area 183, the POS system 100 can indicate that that object corresponds to an unexpected load measurement in the bagging area. The POS system 100 can determine that the target object 147a-b, 151, 153, 155 corresponds to the certain object type that can be transferred from the second region 185a-c to the bagging area 183 without having to be weighed or scanned. The POS system 100 can then determine that the unexpected load measurement in the bagging area 183 is associated with an object that can be in the bagging area without having to be weighed or scanned.

Otherwise, if an object is associated with an unexpected load measurement in the bagging area and that object does not correspond to a certain object type, then the POS system 100 can notify the consumer 171 to remove the unexpected weight. For instance, the processing circuitry of the POS system 100 can send, to the display 118, an indication associated with a request to remove the unexpected weight from the bagging area 183. Additionally or alternatively, the POS system 100 can prompt the consumer to confirm whether the unexpected weight is associated with an unscanned item. For instance, the processing circuitry of the POS system 100 can send, to the display 118, an indication associated with a request to confirm whether the unexpected weight in the bagging area 183 is associated with an unscanned item (e.g., clothes, hat, purse, handbag, wallet, eyewear, phone, laptop, shopping bag, coffee, soda, return item).

In another embodiment, the POS system 100 can obtain a load measurement of the target object 147a-b, 151, 153, 155 while positioned in the bagging area 183. The POS system 100 can determine that the target object 147a-b, 151, 153, 155 corresponds to the certain object type that can be transferred from the second region 185a-c to the bagging area 183 without having to be weighed or scanned. Further, the POS system 100 can obtain an expected weight of that certain object type. The POS system 100 can then determine that the load measurement of the target object 147a-b, 151, 153, 155 corresponds to the expected weight of that certain object type. The POS system 100 can verify that the target object 147a-b, 151, 153, 155 can be in the bagging area 183 without having to be weighed or scanned. For example, the POS system obtains a load measurement of one hundred fifty (150) grams of a target object. The POS system 100 determines that the certain object type of the target object is a smartphone. The POS system 100 obtains an expected weight range from one hundred (100) grams to two hundred (200) grams for a smartphone object type. The POS system 100 determines that the load measurement of the target object corresponds to the expected weight of the smartphone object type and as such, determines that the target object can be in the bagging area 183 without having to be weighted or scanned.

Figure 2:
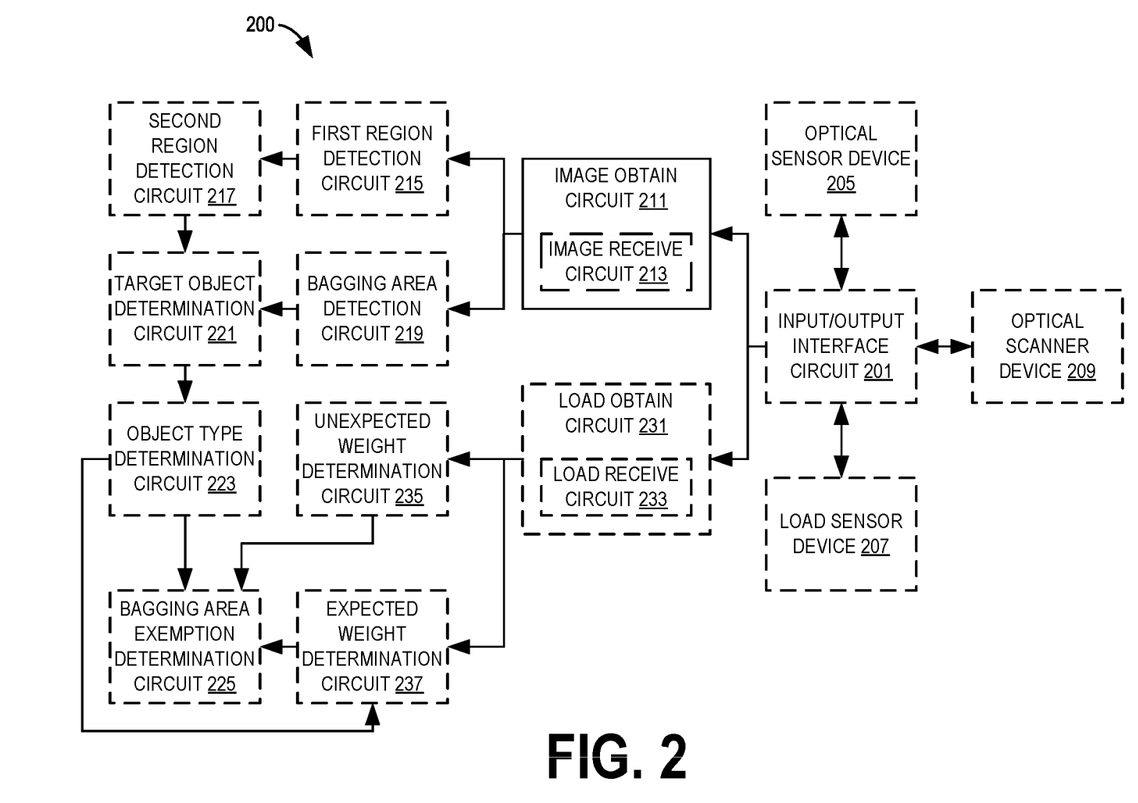
FIG. 2 illustrates another embodiment of a POS system in accordance with various aspects as described herein.

FIG. 2 illustrates another embodiment of a POS system or device 200 in accordance with various aspects as described herein. In FIG. 2, the device 200 implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: an input/output interface circuit 201 operable to interface with input and output devices such as an optical sensor device 205 (e.g., camera), a load sensor device 207 (e.g., weight scale), an optical scanner device 209 (e.g., camera, scanner), or the like; an image obtain circuit 211 operable to obtain an image such as from the optical sensor device 205 or the optical scanner device 207; an image receive circuit 213 operable to receive, from the optical sensor device 205 or the optical scanner device 207, an indication that includes an image; a first region activity detection circuit 215 operable to detect activity in the first region based on a captured image; a second region activity detection circuit 217 operable to determine that the detected activity in the first region corresponds to a object in the second region based on a captured image; a bagging area detection circuit 219 operable to detect activity in the bagging area based on a captured image; an object determination circuit 221 operable to determine that the detected activity in the bagging area corresponds to the object in the bagging area based on a captured image; an object type determination circuit 223 operable to determine that an object corresponds to a certain object type that can be transferred from a second region to a bagging area without having to be scanned or weighed; a bagging area exemption determination circuit 225 operable to determine that an object can be in the bagging area without having to be weighted or scanned; a load obtain circuit 231 operable to obtain a load measurement of an object while positioned in the bagging area; a load receive circuit 233 operable to receive, from the load sensor device 207, an indication that includes a load measurement of an object while positioned in the bagging area; an unexpected weight determination circuit 235 operable to determine that a load measurement of an object corresponds to an unexpected load measurement in the bagging area; and an expected weight determination circuit 237 operable to determine that a load measurement of an object corresponds to an expected weight of a corresponding object type.

Figure 3:
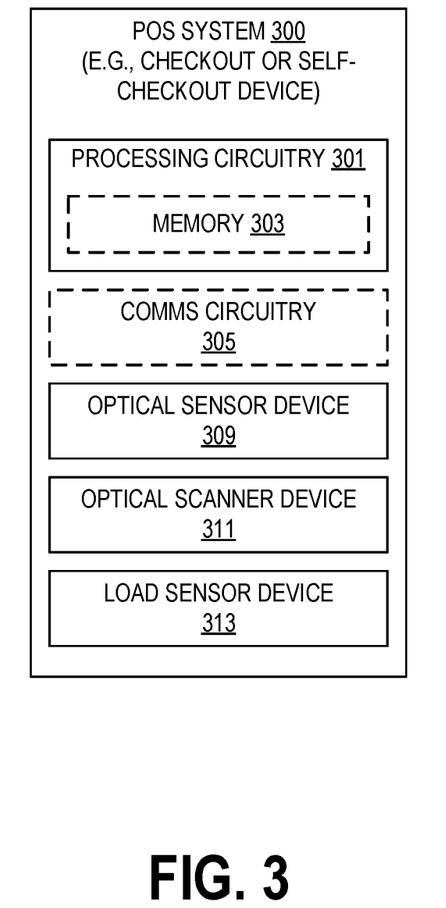
FIG. 3 illustrates another embodiment of a POS system in accordance with various aspects as described herein.

FIG. 3 illustrates another embodiment of a POS system 300 in accordance with various aspects as described herein. In FIG. 3, the device 300 may include processing circuitry 301 that is operably coupled to one or more of the following: memory 303, network communications circuitry 305, an optical sensor device 309 (e.g., camera), an optical scanner device 311 (e.g., scanner), a load sensor device 313, the like, or any combination thereof. The network communication circuitry 305 is configured to transmit or receive information to or from one or more other devices via any communication technology. The processing circuitry 301 is configured to perform processing described herein, such as by executing instructions stored in memory 303. The processing circuitry 301 in this regard may implement certain functional means, units, or modules. The optical sensor device 309 is operable to capture an image, the optical scanner device 311 is operable to capture a visual object identifier code disposed on an object, and the load sensor device 313 is operable to measure a load of an object.

Figure 4A:
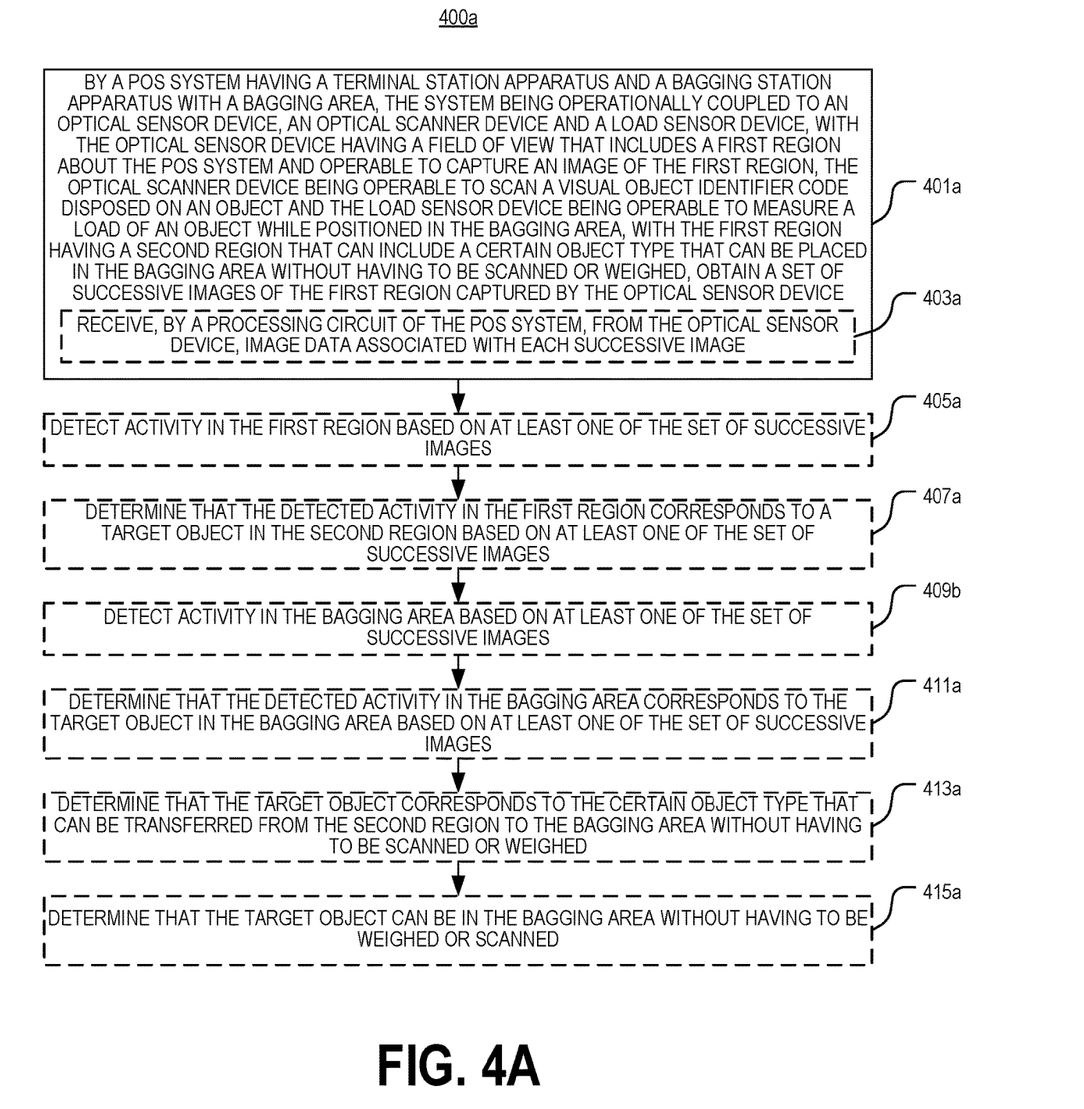
FIGS. 4A-C illustrate embodiments of a method performed by a POS system of activity detection at point of sale in accordance with various aspects as described herein.

FIG. 4A illustrates one embodiment of a method 400a performed by a POS system 100, 200, 300, 500 of activity detection at point of sale in accordance with various aspects as described herein. In FIG. 4A, the method 400a may start, for instance, at block 401a where it may include obtaining each successive image of the first region captured by the optical sensor device. For instance, at block 403a, the method 400a may include receiving, by a processing circuit of the POS system 100, 200a-c, 300, 500, from the optical sensor device, image data associated with each successive image. At block 405a, the method 400a may include detecting activity in the first region based on at least one of the set of successive images. At block 407a, the method 400a may include determining that the detected activity in the first region corresponds to a target object in the second region based on at least one of the set of successive images. Further, at block 409a, the method 400a may include detecting activity in the bagging area based on at least one of the set of successive images. The method 400a may also include determining that the detected activity in the bagging area corresponds to the target object in the bagging area based on at least one of the set of successive images, as represented at block 411a. At block 413a, the method 400a includes determining that the target object corresponds to the certain object type that can be transferred from the second region to the bagging area without having to be scanned or weighed. In addition, at block 415a, the method 400a may include determining that the target object can be in the bagging area without having to be weighted or scanned.

Figure 4B:
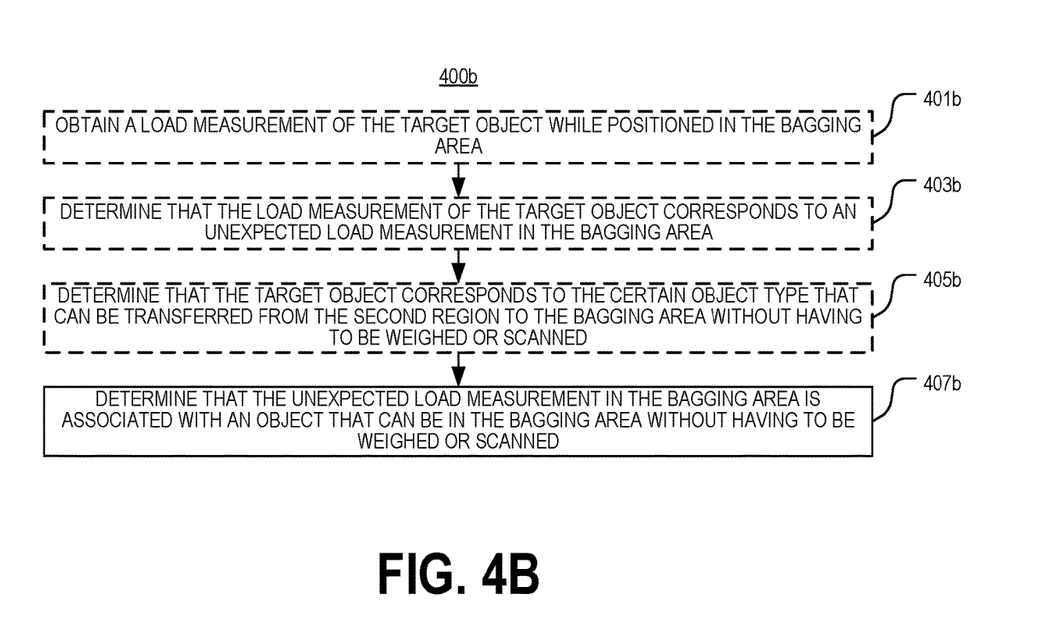

FIG. 4B illustrates another embodiment of a method 400b performed by a POS system 100, 200, 300, 500 of activity detection at point of sale in accordance with various aspects as described herein. In FIG. 4B, the method 400b may start, for instance, at block 401b where it may include obtaining a load measurement of the target object while positioned in the bagging area. At block 403b, the method 400b may include determining that the load measurement of the target object corresponds to an unexpected load measurement in the bagging area. At block 405b, the method 400b may include determining that the target object corresponds to the certain object type that can be transferred from the second region to the bagging area without having to be weighed or scanned. In addition, the method 400b includes determining that the unexpected load measurement in the bagging area is associated with an object that can be in the bagging area without having to be weighed or scanned.

Figure 4C:
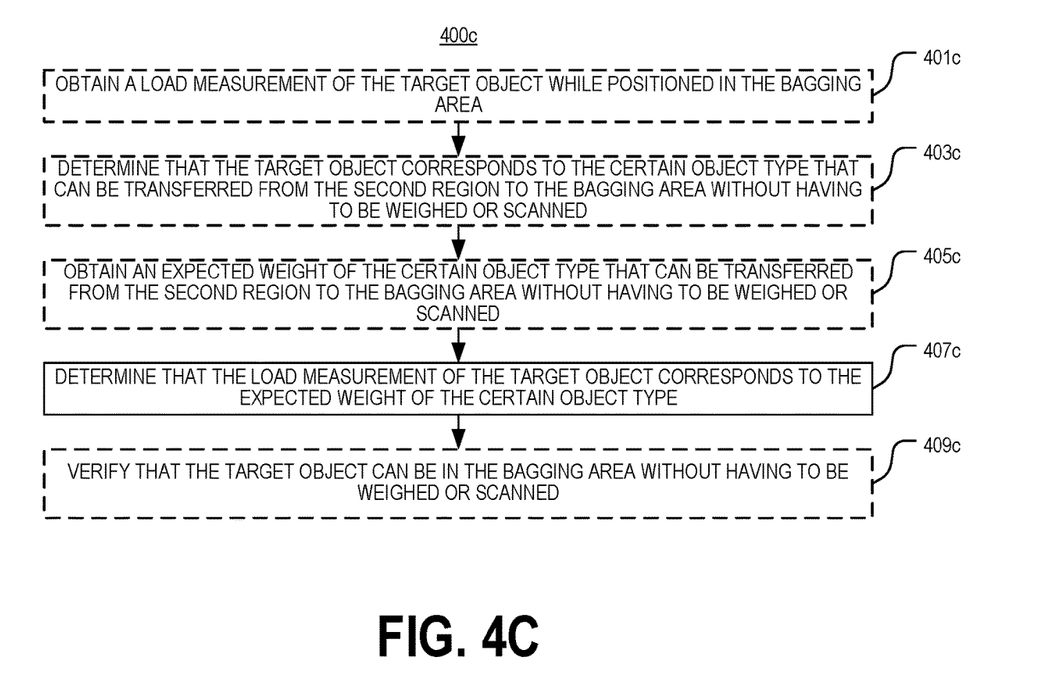

FIG. 4C illustrates another embodiment of a method 400c performed by a POS system 100, 200, 300, 500 of activity detection at point of sale in accordance with various aspects as described herein. In FIG. 4B, the method 400b may start, for instance, at block 401b where it may include obtaining a load measurement of the target object while positioned in the bagging area. At block 403c, the method 400c can include determining that the target object corresponds to the certain object type that can be transferred from the second region to the bagging area without having to be weighed or scanned. At block 405c, the method 400c can include obtaining an expected weight of the certain object type that can be transferred from the second region to the bagging area without having to be weighed or scanned. The method 400c includes determining that the load measurement of the target object corresponds to the expected weight of the certain object type that can be transferred from the second region to the bagging area without having to be weighed or scanned, as represented by block 407c. In addition, at block 409c, the method 400c may include determining that the target object can be in the bagging area without having to be weighed or scanned.

Figure 5:
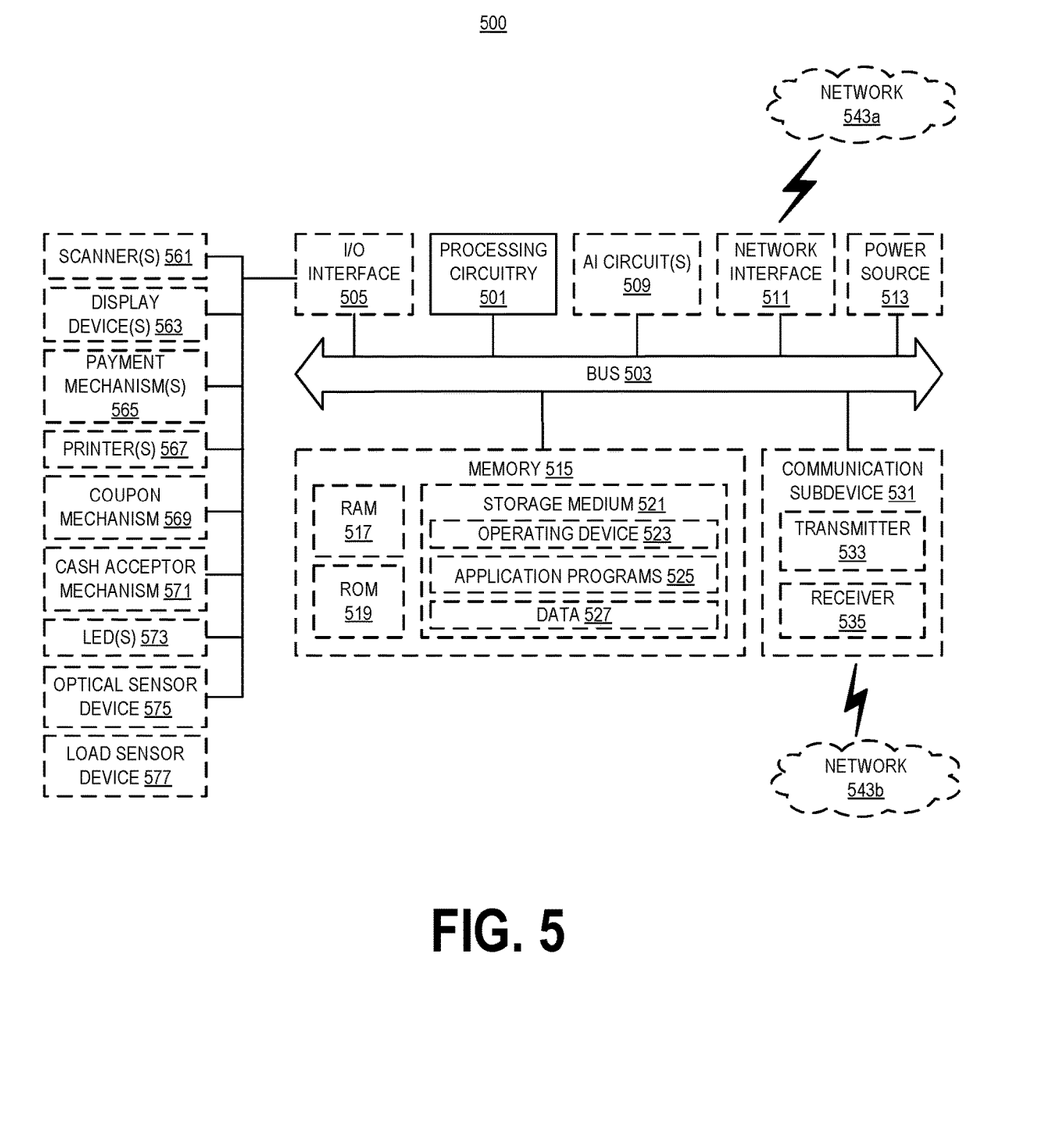
FIG. 5 illustrates another embodiment of a POS system in accordance with various aspects as described herein.

FIG. 5 illustrates another embodiment of a POS system/device or an optical sensor node system/device (e.g., camera system) 500 in accordance with various aspects as described herein. In FIG. 5, device 500 includes processing circuitry 501 that is operatively coupled over bus 503 to input/output interface 505, artificial intelligence circuitry 509 (e.g., neural network circuit, machine learning circuit), network connection interface 511, power source 513, memory 515 including random access memory (RAM) 517, read-only memory (ROM) 519 and storage medium 521, communication subsystem 531, and/or any other component, or any combination thereof. In one example, the POS system device 500 can be operatively coupled to one or more optical sensor system devices 500 over a wired communication interface (e.g., USB, Ethernet) or wireless communication interface (e.g., WiFi, Bluetooth). Further, the POS system device 500 can be operatively coupled to one or more optical sensor system devices 500 via the network connection interface 511 or the communication subsystem 531.

The input/output interface 505 may be configured to provide a communication interface to an input device, output device, or input and output device. The device 500 may be configured to use an output device via input/output interface 505. An output device 561 may use the same type of interface port as an input device. For example, a USB port or a Bluetooth port may be used to provide input to and output from the device 500. The output device may be a speaker, a sound card, a video card, a display, a monitor, a printer, an actuator, a transducer 575 (e.g., speaker, ultrasound emitter), an emitter, a smartcard, another output device, or any combination thereof. The device 500 may be configured to use an input device via input/output interface 505 to allow a user to capture information into the device 500. The input device may include a scanner device 561 (e.g., optical scanner device), a touch-sensitive or presence-sensitive display 563, an optical sensor device 575 (e.g., camera), a load sensor (e.g., weight sensor), a microphone, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, a microphone, an ultrasound sensor, another like sensor, or any combination thereof. As shown in FIG. 500, the input/output interface 505 can be configured to provide a communication interface to components of the POS system 100 such as the scanner associated with the scanner window 115, the scanner 116, a scale associated with the scan platform 114, the display device 118, touchscreen 118, the payment processing mechanism 122, the printer 124, the coupon slot mechanism 125, the cash acceptor mechanism 126, light emitting devices 130, keyboard, keypad, card reader, the like, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the artificial intelligence circuitry 509 may be configured to learn to perform tasks by considering examples such as performing activity detection, classification or identification of objects based on an image. In one example, first artificial intelligence circuitry is configured to perform activity detection. Further, second artificial intelligence circuitry is configured to perform object classification or identification. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, shortrange communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is by POS) system having a terminal station apparatus and a bagging station apparatus with a bagging area. Further, the system is operationally coupled to an optical sensor device, an optical scanner device and a load sensor device. The optical sensor device has a field of view that includes a first region about the POS system and is operable to capture an image that includes the first region. The optical scanner device is operable to scan a visual object identifier code disposed on an object. The load sensor device is operable to measure a load of an object while positioned in the bagging area. Further, the first region includes a second region that can include a certain object type that can be positioned in the bagging area without having to be scanned or weighed. The method includes obtaining a set of successive images captured by the optical sensor device and associated with a target object being transferred from the second region to the bagging area to enable a determination that the target object corresponds to the certain object type that can be placed in the bagging area without having to be scanned or weighed based on the set of successive images.

In another exemplary embodiment, wherein the obtaining step further includes receiving, by a processing circuit of the POS system, from the optical sensor device, image data of each successive image.

In another exemplary embodiment, the method further includes obtaining the load measurement associated with the target object while positioned in the bagging area.

In another exemplary embodiment, wherein the load obtaining step further includes receiving, by a processing circuit of the POS system, from the load sensor device, the load measurement associated with the target object placed in the bagging area.

In another exemplary embodiment, the method further includes determining that the target object can be transferred from the second region to the bagging area without having to be scanned or weighed based on the set of successive images.

In another exemplary embodiment, the method further includes determining that the target object corresponds to the certain object type that can be transferred from the second region to the bagging area without having to be weighed or scanned. The method further includes determining that a load measurement of the target object corresponds to an expected load of the certain object type. The method also includes determining that the target object can be transferred from the second region to the bagging area without having to be scanned or weighed based on the set of successive.

In another exemplary embodiment, the method further includes detecting activity in the first region based on at least one of the set of successive images. The method further includes determining that the detected activity in the first region corresponds to the target object in the second region based on at least one of the set of successive images. The method also includes determining that the target object can be in the bagging area without having to be scanned or weighed based on the set of successive.

In another exemplary embodiment, the method further includes detecting activity in the bagging area based on at least one of the set of successive images. The method further includes determining that the detected activity in the bagging area corresponds to the target object positioned in the bagging area based on at least one of the set of successive images. The method also includes determining that the target object can be in the bagging area without having to be scanned or weighed based on the set of successive.

In another exemplary embodiment, the method further includes determining that the target object corresponds to the certain object type that can be transferred from the second region to the bagging area without having to be scanned or weighed. The method further includes determining that the target object can be in the bagging area without having to be weighed or scanned.

In another exemplary embodiment, the method further includes: obtaining a load measurement associated with the target object while positioned in the bagging area; determining that the load measurement of the target object corresponds to an unexpected load measurement in the bagging area; determining that the target object corresponds to the certain object type that can be transferred from the second region to the bagging area without having to be weighed or scanned; and determining that the unexpected load measurement in the bagging area is associated with an object that can be in the bagging area without having to be weighed or scanned.

In another exemplary embodiment, the method further includes: obtaining a load measurement associated with the target object while positioned in the bagging area; determining that the target object corresponds to the certain object type that can be transferred from the second region to the bagging area without having to be weighed or scanned; obtaining an expected weight of the certain object type that can be transferred from the second region to the bagging area without having to be weighed or scanned; determining that the load measurement of the target object corresponds to the expected weight of the certain object type; and determining that the target object can be in the bagging area without having to be weighed or scanned.

In one exemplary embodiment, a POS system includes a terminal station apparatus and a bagging station apparatus with a bagging area. Further, the system is operationally coupled to an optical sensor device, an optical scanner device and a load sensor device. The optical sensor device has a field of view that includes a first region about the POS system and is operable to capture an image that includes the first region. The optical scanner device is operable to scan a visual object identifier code disposed on an object. The load sensor device is operable to measure a load of an object while placed in the bagging area. Further, the first region includes a second region that can include a certain object type that can be positioned in the bagging area without having to be scanned or weighed. In addition, the POS system includes a memory with the memory containing instructions executable by the processing circuitry whereby the processing circuitry is configured to obtain a set of successive images captured by the optical sensor device and associated with a target object being transferred from the second region to the bagging area to enable a determination that the target object corresponds to the certain object type that can be placed in the bagging area without having to be scanned or weighed based on the set of successive images.

In another exemplary embodiment, the memory includes further instructions executable by the processing circuitry whereby the processing circuitry is configured to determine that the target object can be transferred from the second region to the bagging area without having to be scanned or weighed based on the set of successive images.

In another exemplary embodiment, the memory includes further instructions executable by the processing circuitry whereby the processing circuitry is configured to: determine that the target object corresponds to the certain object type that can be transferred from the second region to the bagging area without having to be weighed or scanned; determine that a load measurement of the target object corresponds to an expected load of the certain object type; and determine that the target object can be transferred from the second region to the bagging area without having to be scanned or weighed based on the set of successive.

In another exemplary embodiment, the memory includes further instructions executable by the processing circuitry whereby the processing circuitry is configured to: detect activity in the first region based on at least one of the set of successive images; determine that the detected activity in the first region corresponds to the target object in the second region based on at least one of the set of successive images; and determine that the target object can be in the bagging area without having to be scanned or weighed based on the set of successive.

In another exemplary embodiment, the memory includes further instructions executable by the processing circuitry whereby the processing circuitry is configured to: detect activity in the bagging area based on at least one of the set of successive images; determine that the detected activity in the bagging area corresponds to the target object positioned in the bagging area based on at least one of the set of successive images; and determine that the target object can be in the bagging area without having to be scanned or weighed based on the set of successive.

In another exemplary embodiment, the memory includes further instructions executable by the processing circuitry whereby the processing circuitry is configured to: determine that the target object corresponds to the certain object type that can be transferred from the second region to the bagging area without having to be scanned or weighed; and determine that the target object can be in the bagging area without having to be weighed or scanned.

In another exemplary embodiment, the memory includes further instructions executable by the processing circuitry whereby the processing circuitry is configured to: obtain a load measurement associated with the target object while positioned in the bagging area; determine that the load measurement of the target object corresponds to an unexpected load measurement in the bagging area; determine that the target object corresponds to the certain object type that can be transferred from the second region to the bagging area without having to be weighed or scanned; and determine that the unexpected load measurement in the bagging area is associated with an object that can be in the bagging area without having to be weighed or scanned.

In another exemplary embodiment, the memory includes further instructions executable by the processing circuitry whereby the processing circuitry is configured to: obtain a load measurement associated with the target object while positioned in the bagging area; determine that the target object corresponds to the certain object type that can be transferred from the second region to the bagging area without having to be weighed or scanned; obtain an expected weight of the certain object type that can be transferred from the second region to the bagging area without having to be weighed or scanned; determine that the load measurement of the target object corresponds to the expected weight of the certain object type; and determine that the target object can be in the bagging area without having to be weighed or scanned.

In one exemplary embodiment, a POS system includes a terminal station apparatus; a bagging station apparatus with a bagging area; an optical sensor device having a field of view that includes a first region about the POS system and operable to capture an image that includes the first region, with the first region having a second region that can include a certain object type that can be positioned in the bagging area without having to be scanned or weighed; an optical scanner device operable to scan a visual object identifier code disposed on an object; a load sensor device operable to measure a load of an object while positioned in the bagging area. Further, the POS system includes a processing circuitry and a memory containing instructions executable by the processing circuitry whereby the processing circuitry is operative to obtain a set of successive images captured by the optical sensor device and associated with a target object being transferred from the second region to the bagging area to enable a determination that the target object corresponds to the certain object type that can be placed in the bagging area without having to be scanned or weighed based on the set of successive images.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein.

Alternatively or additionally, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a point of sale (POS) system having a terminal station apparatus and a bagging station apparatus with a bagging area, the system having processing circuitry operationally coupled to an optical sensor device, an optical scanner device and a load sensor device, with the optical sensor device having a field of view that includes a first region about the POS system and operable to capture an image that includes the first region, the optical scanner device being operable to scan a visual object identifier code disposed on an object and the load sensor device being operable to measure a load of an object while positioned in the bagging area, with the first region having a second region that can include a pre-designated object type that can be placed in the bagging area without having to be scanned or weighed-,
   obtaining a successive image captured by the optical sensor device and associated with a target object being transferred from the second region to the bagging area;
   determining, based on analysis of the successive image and identified by image characteristics of the successive image without requiring identification of the object as a saleable or non-saleable item, that the target object corresponds to the pre-designated object type that can be placed in the bagging area without having to be scanned or weighed; and permitting the target object to remain in the bagging area without sending an indication to resolve an unexpected load.

2. The method of claim 1, wherein the image obtaining step further includes receiving, by the processing circuitry of the POS system, from the optical sensor device, image data of each successive image.

3. The method of claim 1, further comprising:
obtaining a load measurement associated with the target object while positioned in the bagging area.

4. The method of claim 3, wherein the load obtaining step further includes:
receiving, by the processing circuitry of the POS system, from the load sensor device, the load measurement associated with the target object placed in the bagging area.

5. The method of claim 1, further comprising:
determining that the target object can be transferred from the second region to the bagging area without having to be scanned or weighed based on the successive image.

6. The method of claim 1, further comprising:
determining that the target object corresponds to the pre-designated object type that can be transferred from the second region to the bagging area without having to be weighed or scanned;
determining that a load measurement of the target object corresponds to an expected load of the pre-designated object type; and
determining that the target object can be transferred from the second region to the bagging area without having to be scanned or weighed based on the successive image.

7. The method of claim 1, further comprising:
detecting activity in the first region based on the successive image;
determining that the detected activity in the first region corresponds to the target object in the second region based on the successive image; and
determining that the target object can be in the bagging area without having to be scanned or weighed based on the successive image.

8. The method of claim 1, further comprising:
detecting activity in the bagging area based on the successive image;
determining that the detected activity in the bagging area corresponds to the target object positioned in the bagging area based on the successive image; and
determining that the target object can be in the bagging area without having to be scanned or weighed based on the successive image.

9. The method of claim 1, further comprising:
determining that the target object corresponds to the pre-designated object type that can be transferred from the second region to the bagging area without having to be scanned or weighed; and
determining that the target object can be in the bagging area without having to be weighed or scanned.

10. The method of claim 1, further comprising:
obtaining a load measurement associated with the target object while positioned in the bagging area;
determining that the load measurement of the target object corresponds to an unexpected load measurement in the bagging area;
determining that the target object corresponds to the pre-designated object type that can be transferred from the second region to the bagging area without having to be weighed or scanned; and
determining that the unexpected load measurement in the bagging area is associated with an object that can be in the bagging area without having to be weighed or scanned.

11. The method of claim 1, further comprising:
obtaining a load measurement associated with the target object while positioned in the bagging area;
determining that the target object corresponds to the pre-designated object type that can be transferred from the second region to the bagging area without having to be weighed or scanned;
obtaining an expected weight of the pre-designated object type that can be transferred from the second region to the bagging area without having to be weighed or scanned;
determining that the load measurement of the target object corresponds to the expected weight of the pre-designated object type; and
determining that the target object can be in the bagging area without having to be weighed or scanned.

12. A point of sale (POS) system, comprising:
with the POS system having a terminal station apparatus and a bagging station apparatus with a bagging area, the system having a processing circuitry operationally coupled to an optical sensor device, an optical scanner device and a load sensor device, with the optical sensor device having a field of view that includes a first region about the POS system and operable to capture an image that includes the first region, the optical scanner device being operable to scan a visual object identifier code disposed on an object and the load sensor device being operable to measure a load of an object while placed in the bagging area, with the first region having a second region that can include a pre-designated object type that can be placed in the bagging area without having to be scanned or weighed,
wherein the POS system further includes a memory, the memory containing instructions executable by the processing circuitry whereby the processing circuitry is configured to:
obtain a successive image captured by the optical sensor device and associated with a target object being transferred from the second region to the bagging area;
determine, based on analysis of the successive image and identified by image characteristics of the successive image without requiring identification of the object as a saleable or non-saleable item, that the target object corresponds to the pre-designated object type that can be placed in the bagging area without having to be scanned or weighed; and
permit the target object to remain in the bagging area without sending an indication to resolve an unexpected load.

13. The POS system of claim 12, wherein the memory includes further instructions executable by the processing circuitry whereby the processing circuitry is configured to:
determine that the target object can be transferred from the second region to the bagging area without having to be scanned or weighed based on the successive image.

14. The POS system of claim 12, wherein the memory includes further instructions executable by the processing circuitry whereby the processing circuitry is configured to:
determine that the target object corresponds to the pre-designated object type that can be transferred from the second region to the bagging area without having to be weighed or scanned;

determine that a load measurement of the target object corresponds to an expected load of the pre-designated object type; and determine that the target object can be transferred from the second region to the bagging area without having to be scanned or weighed based on the successive image.

15. The POS system of claim 12, wherein the memory includes further instructions executable by the processing circuitry whereby the processing circuitry is configured to:

detect activity in the first region based on the successive image;

determine that the detected activity in the first region corresponds to the target object in the second region based on the successive image; and determine that the target object can be in the bagging area without having to be scanned or weighed based on the successive image.

16. The POS system of claim 12, wherein the memory includes further instructions executable by the processing circuitry whereby the processing circuitry is configured to:

detect activity in the bagging area based on the successive image;

determine that the detected activity in the bagging area corresponds to the target object positioned in the bagging area based on the successive image; and determine that the target object can be in the bagging area without having to be scanned or weighed based on the successive image.

17. The POS system of claim 12, wherein the memory includes further instructions executable by the processing circuitry whereby the processing circuitry is configured to:

determine that the target object corresponds to the pre-designated object type that can be transferred from the second region to the bagging area without having to be scanned or weighed; and determine that the target object can be in the bagging area without having to be weighed or scanned.

18. The POS system of claim 12, wherein the memory includes further instructions executable by the processing circuitry whereby the processing circuitry is configured to:

obtain a load measurement associated with the target object while positioned in the bagging area;

determine that the load measurement of the target object corresponds to an unexpected load measurement in the bagging area;

determine that the target object corresponds to the pre-designated object type that can be transferred from the second region to the bagging area without having to be weighed or scanned; and determine that the unexpected load measurement in the bagging area is associated with an object that can be in the bagging area without having to be weighed or scanned.

19. The POS system of claim 12, wherein the memory includes further instructions executable by the processing circuitry whereby the processing circuitry is configured to:

obtain a load measurement associated with the target object while positioned in the bagging area;

determine that the target object corresponds to the pre-designated object type that can be transferred from the second region to the bagging area without having to be weighed or scanned;

obtain an expected weight of the pre-designated object type that can be transferred from the second region to the bagging area without having to be weighed or scanned;

determine that the load measurement of the target object corresponds to the expected weight of the pre-designated object type; and determine that the target object can be in the bagging area without having to be weighed or scanned.

20. A point of sale (POS) system, comprising:

a terminal station apparatus;

a bagging station apparatus with a bagging area;

an optical sensor device having a field of view that includes a first region about the POS system and operable to capture an image that includes the first region, with the first region having a second region that can include a pre-designated object type that can be placed in the bagging area without having to be scanned or weighed;

an optical scanner device operable to scan a visual object identifier code disposed on an object;

a load sensor device operable to measure a load of an object while positioned in the bagging area;

a processing circuitry; and a memory containing instructions executable by the processing circuitry whereby the processing circuitry is operative to:

obtain a successive image captured by the optical sensor device and associated with a target object being transferred from the second region to the bagging area;

determine, based on analysis of the successive image and identified by image characteristics of the successive image without requiring identification of the object as a saleable or non-saleable item, that the target object corresponds to the pre-designated object type that can be placed in the bagging area without having to be scanned or weighed; and permit the target object to remain in the bagging area without sending an indication to resolve an unexpected load.

* * * * *